United States Patent [19]
Walter

[11] Patent Number: 5,684,456
[45] Date of Patent: Nov. 4, 1997

[54] TILT-SENSOR

[75] Inventor: Joachim Walter, Troy, Mich.

[73] Assignee: Temic Telefunken Microelectronic GmbH, Heilbronn, Germany

[21] Appl. No.: 746,955

[22] Filed: Nov. 18, 1996

[30] Foreign Application Priority Data

Feb. 19, 1996 [DE] Germany ............ 196 06 043.5

[51] Int. Cl.$^6$ ............ B60Q 1/00
[52] U.S. Cl. ............ 340/440; 73/514.28; 73/514.34; 200/61.48; 200/61.49
[58] Field of Search ............ 340/440, 689; 200/61.47, 61.48, 61.49, 61.52; 73/514.23, 514.28, 514.34; 180/282, 283

[56] References Cited

U.S. PATENT DOCUMENTS

| | | | |
|---|---|---|---|
| 2,938,973 | 5/1960 | Swanwick | 200/61.48 |
| 4,028,516 | 6/1977 | Hirashima et al. | 200/61.49 |
| 4,306,456 | 12/1981 | Maerfeld | 73/514.28 |
| 4,397,185 | 8/1983 | Craig et al. | 73/514.23 |
| 4,676,104 | 6/1987 | Cullen | 73/516 R |
| 5,393,944 | 2/1995 | Manandhar et al. | 200/61.49 |
| 5,535,639 | 7/1996 | Ogata | 200/61.52 |
| 5,542,297 | 8/1996 | Mizund et al. | 73/514.34 |

FOREIGN PATENT DOCUMENTS

| | | |
|---|---|---|
| 0059793 | 9/1982 | European Pat. Off. . |
| 0351038 | 1/1990 | European Pat. Off. . |

OTHER PUBLICATIONS

JP 57-79406 A in: Patents Abstracts of Japan, p. 137, Aug. 25, 1982, vol. 6, No. 162.

*Primary Examiner*—Jeffery Hofsass
*Assistant Examiner*—John Tweel, Jr.
*Attorney, Agent, or Firm*—Paul J. Vincent

[57] ABSTRACT

A tilt-sensor for detection of a tilt angle is proposed, in particular for use as a roll-over sensor in a car for activation of an occupant protection device, comprising a massive body and an associated receptacle and having the following features: the receptacle is V-shaped in form, an inflection arm is disposed at each inner side of each of the two legs of the V-shaped receptacle, the massive body is configured in such a fashion that it seats, flush with the surface, on the inflection arms at the inner side of the V-shaped receptacle, and extension measurement elements are provided for the production of a tilt-angle dependent measuring signal to measure the deformation caused by the massive body during a rotation or deflection of the tilt-sensor through the tilt angle.

9 Claims, 3 Drawing Sheets

TILT-SENSOR

BACKGROUND OF THE INVENTION

The invention concerns a tilt-sensor for detection of a tilt angle (α), in particular for use as a roll-over sensor in a car for activating an occupant protection device, and comprising a massive body and an associated receptacle.

Acceleration sensors, in particular for use as roll-over sensors, are intended to recognize a roll-over about the longitudinal axis of convertibles and, to an ever increasing extent, of off-road vehicles having a high center of gravity in order to timely activate occupant protection systems.

A prior art tilt-sensor of this kind is, for example, known in the art through laid-open publication DE 38 15 938 A1. The so-called "bubble level sensor" described therein has, however, the disadvantage that it requires a relatively large amount of space and, for this reason, cannot be accommodated together with collision sensors within a single housing as an augmented occupant protection system.

It is the purpose of the invention to introduce a tilt-sensor which does not have the above mentioned disadvantages.

SUMMARY OF THE INVENTION

This purpose is achieved through the presentation of a tilt-sensor for detecting a tilt angle, in particular for use as a roll-over sensor in a car for triggering an occupant protection device, comprising a massive body and an associated receptacle, and having the following features:

the receptacle has a V-shaped form, an inflection arm is disposed on each inner side of each of the two legs of the V-shaped receptacle, the massive body is configured in such a fashion that it seats on the surface of and is flush with the inflection arm at the inner side of the V-shaped receptacle, and extension measurement elements are provided for producing tilt-angle dependent measurement signals to measure deformations caused by the massive body during a rotation or deflection of the tilt-sensor through the tilt angle.

Advantageous improvements of the invention are described in the dependent claims.

The advantages of the invention are that material costs can be reduced through the use of a reduced number of smaller components and the tilt-sensor can be disposed, together with a collision sensor, within one housing.

An embodiment of the invention is described in detail below and represented with reference to the figures.

BRIEF DESCRIPTION OF THE DRAWINGS

FIG. 4b shows the forces and angles associated with FIG. 4a.

DESCRIPTION OF THE PREFERRED EMBODIMENT

Figure 1:
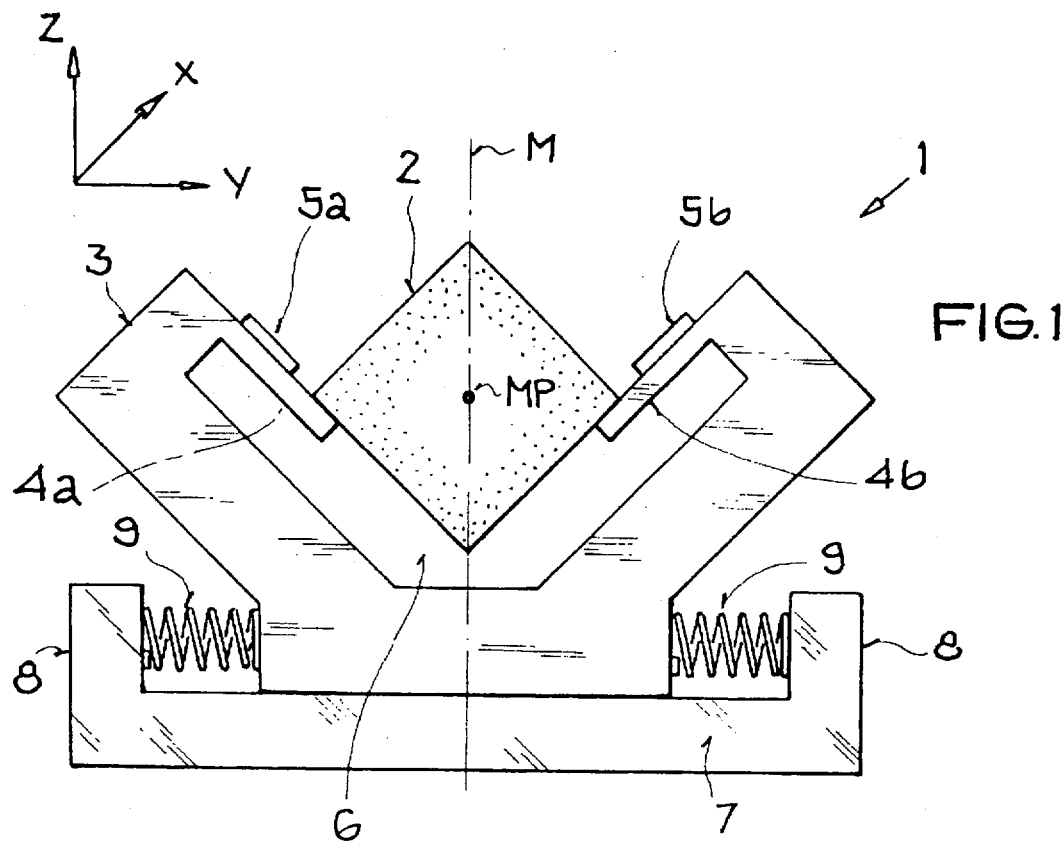
FIG. 1 shows a sectional drawing of an acceleration sensor in accordance with the invention.

FIG. 1 shows a tilt-sensor 1, having a center parallel M, for measurement of acceleration forces in the y- and z-directions, with which a preferentially cubic massive body 2, having a mass center MP and as high a specific weight as possible (e.g. made from lead), stands on one cube edge in such a fashion that the gravitational force vector G is directed from the mass center MP through this edge in a horizontal configuration of the acceleration sensor 1. The massive body 2 is borne in a V-shaped receptacle 3 and connected with same in such a fashion that the cube 2 is firmly held in the receptacle 3 when shaken. This can be done with localized glueing or by means of a mounting arranged at that position where the sidewardly running edges of the cube 2 contact the receptacle 3.

The receptacle 3 has self-supporting inflection arm 4a and 4b respectively on each inner side of both of its legs, which are produced micromechanically and which have a self-supporting length greater than the length of the edge of the massive body 2. Each inflection arm 4a and 4b respectively is connected at one end to the preferentially silicon receptacle 3 and has, in proximity to this location, an extension measurement element 5a and 5b respectively, e.g. an extension measurement strip or a piezoresistive element. An etched-open region 6 is located beneath the inflection arms 4a and 4b respectively.

When the acceleration sensor 1 is deflected out of the horizontal position in a clockwise or counter-clockwise direction, the massive body 2, due to its inertia, exercises a pressure-force on the left or right inflection arm 4a and 4b respectively as a result of which the corresponding inflection arm 4a or 4b is elastically deformed and deflected into the etched-open region 6. The mechanical deformation of the inflection arm 4a and 4b is transferred to the respective extension measurement element 5a or 5b to produce an electrical quantity therein, e.g. a resistance or a voltage, which is proportional to the original pressure force. This electrical quantity is introduced to an evaluation unit.

The receptacle 3 seats in a displaceable fashion on a base plate 7 which is preferentially metallic and which comprises an upwardly directed border 8 on each of its two opposite edges. A damping element 9 is disposed between each of the two borders 8 and the receptacle 3 to aperiodically damp transient transverse acceleration. The damping element 9 is preferentially a spring or an elastically deformable mass such as rubber or the like.

Figure 2:
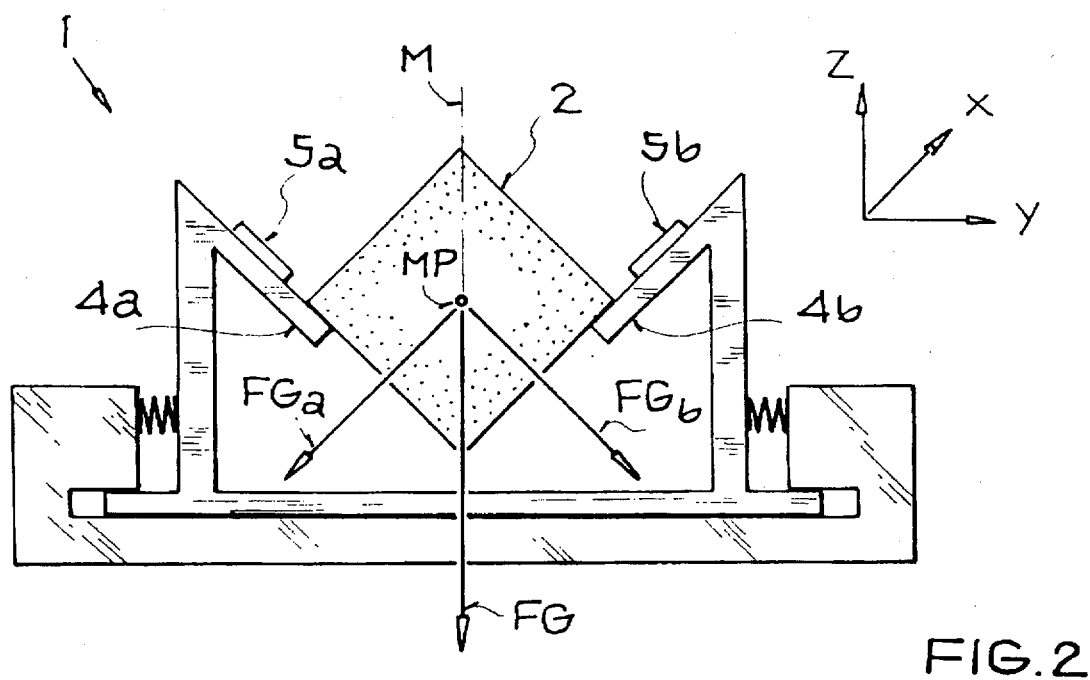
FIG. 2 shows a sketch of the acceleration sensor in a horizontal neutral position.

FIG. 2 shows the tilt-sensor 1 sketched in a horizontal neutral position in which only the gravitational force FG of the cube 2, drawn at the mass center MP, is active. A decomposition of the vector FG into two components FGa and FGb, with FGa acting perpendicular to the inflection arm 4a and FGb perpendicular to the inflection arm 4b, results in deformation forces FGa and FGb of equal magnitude for both inflection arms 4a and 4b. Consequently, both deflection arms 4a and 4b have equal deformations and both extension measurement elements 5a and 5b issue electrical quantities of equal magnitude. In this manner, the downstream evaluation unit recognizes that no acceleration forces act on the tilt-sensor 1 in the y- or z-directions.

Figure 3A:
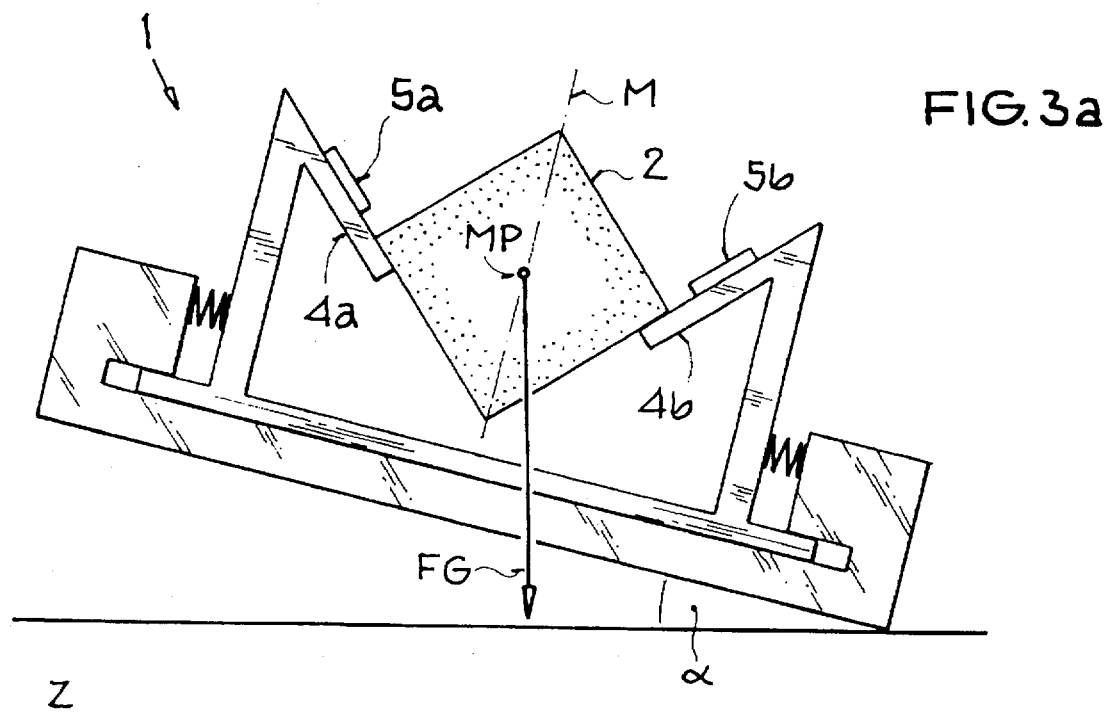
FIG. 3a shows a sketch of the acceleration sensor in the deflected state, FIG. 3b forces and angles associated with FIG. 3a, FIG. 4a shows a sketch of the acceleration sensor in the deflected state under the influence of an acceleration force transverse to the vehicle travel direction
Figure 3B:
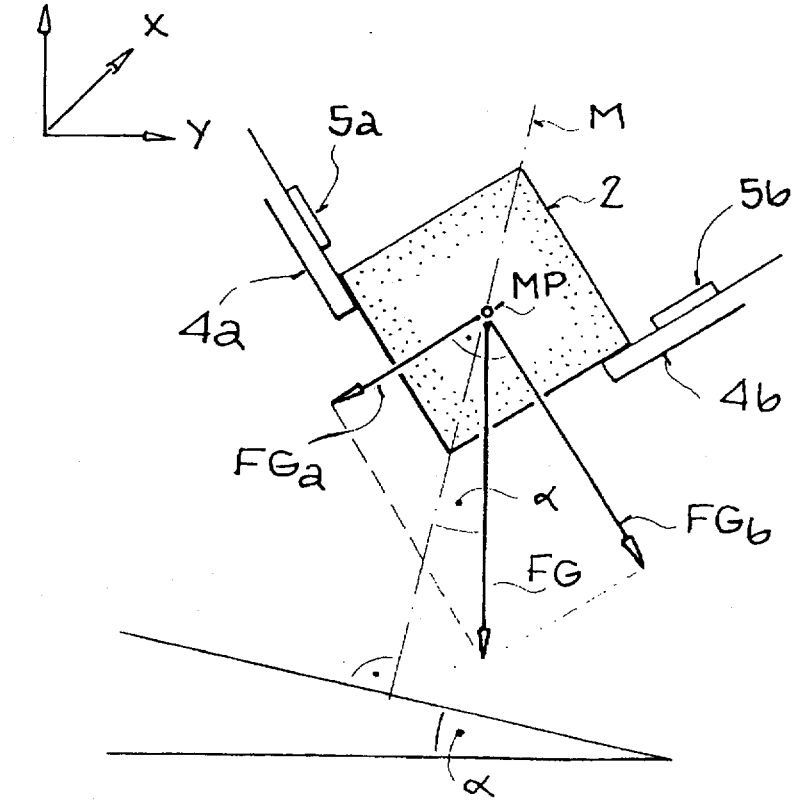

FIG. 3a schematically shows the tilt-sensor 1 in a position deflected through a tilt angle α relative to the center parallel M, whereby the associated angle and the active forces are shown in FIG. 3b. Although only the gravitational force FG of the cube 2, indicated at the mass center MP, acts on the tilt-sensor 1, the deflection through the tilt angle α causes the inflection arms 4a and 4b to be loaded differently. If one decomposes the gravitational force vector FG into two components FGa and FGb, with FGa acting perpendicularly on the inflection arm 4a and FGb perpendicularly on the inflection arm 4b, one recognizes differing loads on the inflections arms 4a and 4b as seen by the differing lengths of the vectors FGa and FGb representing the magnitude of the force associated therewith in each case.

The extension measurement elements 5a and 5b issue electrical quantities of different magnitudes to the downstream evaluation unit in the event of a deflection of the acceleration sensor 1 through the tilt angle α due to the differing forces FGa and FGb acting on the inflection arms 4a and 4b respectively. It is possible to determine the tilt angle α using geometrical relationships which are conventional and therefore not further described herein when the evaluation unit is given the magnitude of the gravitational force FG.

Figure 4A:
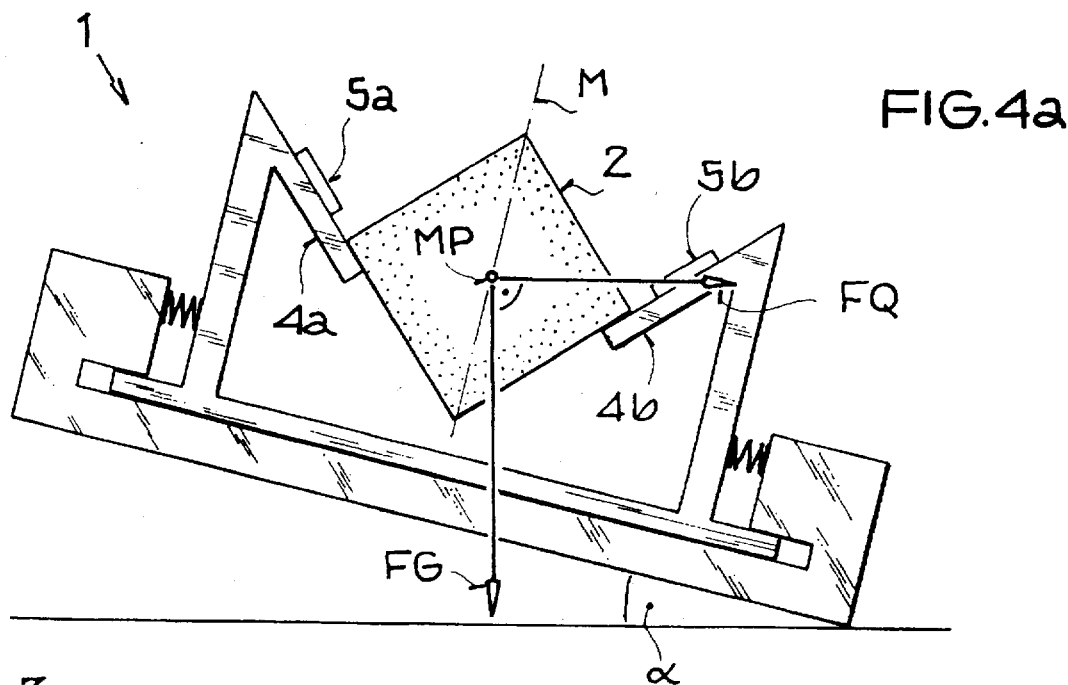
Figure 4B:
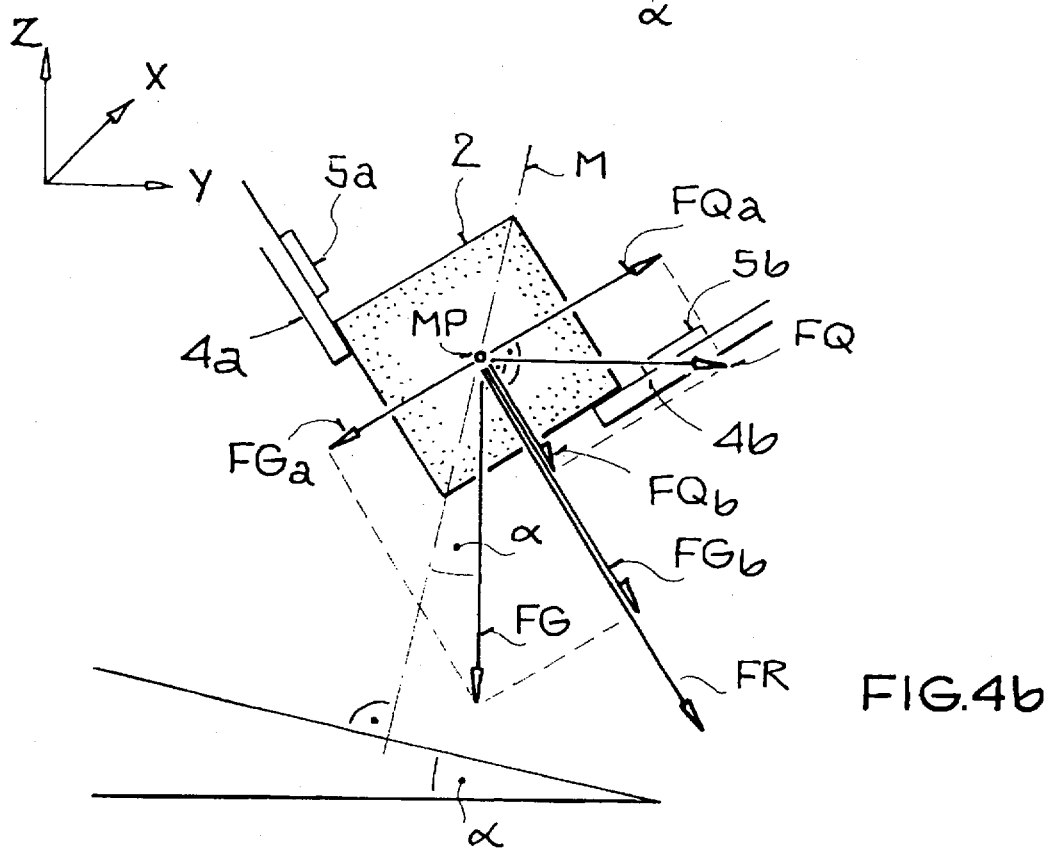

FIG. 4a schematically shows the tilt-sensor 1 in a position deflected through the tilt angle α and being subjected to a transverse acceleration force FQ in the y-direction, wherein FIG. 4b shows the corresponding angle and the active forces. The gravitational force FG of the cube 2 and the transverse acceleration force FQ act at the mass center MP. If both forces, the gravitational force FG and the transverse acceleration force FQ respectively, are each decomposed into a component FGa and FQa respectively which is perpendicular to inflection arm 4a and into a component FGb and FQb respectively which is perpendicular to inflection arm 4b, it can be seen that the inflection arm 4a is pressure-relieved by the magnitude of the component FQa and the inflection arm 4b is additionally loaded by the magnitude of the component FQb. The downstream evaluation unit thereby recognizes that not only is the cube 2 tilted through the angle α but that an additional transverse acceleration force FQ acts thereon.

The interdependence of the tilt angle α and the electrical quantities issued by the extension measurement elements 5a and 5b respectively in each case, leads to a table of values stored in the evaluation unit. A critical tilt angle has been reached when e.g. a motor vehicle in which the tilt-sensor 1 is installed is in danger of tilting onto its side.

Simulations have shown that evaluation of this critical situation in which the occupant protection device, e.g. a roll bar, must be activated is substantially dependent only on the magnitude of a resultant force FR comprised from the forces FGa, FQa and FGb, FQb acting on the respective inflection arms 4a and 4b and consequently acting perpendicularly on the corresponding respective inflection arms 4a and 4b. The fractional contributions of the components FGa, FQa and FGb, FQb respectively to the resultant force FR are not of consequence. It is not necessary to carry out the difficult calculation of the actual tilt angle α and of the actual transverse acceleration force FG in order to calculate the critical tilt angle. Transient transverse accelerations, which e.g. could be caused by vehicle travel through a curve, would interfere with the measurement and are therefore aperiodically damped by means of the damping elements 9 (FIG. 1).

The tilt-sensor in accordance with the invention is particularly suited for use in cars in which an occupant protection device e.g. a roll bar must be activated when there is the danger of a roll-over transverse to the direction of travel of the vehicle.

We claim:

1. Tilt-sensor for detection of a tilt angle and adapted for use as a roll-over sensor in a car to activate an occupant protection device, the tilt-sensor comprising:

V-shaped receptacle means having a first leg with a first inner side and a second leg with a second inner side, said first leg having a first inflection arm disposed at said first inner side, said inflection arm having a first surface and said second leg having a second inflection arm disposed at said second inner side said second inflection arm having a second surface;

a massive body having a first area and a second area, said first area seating flush with said first surface and said second area seating flush with said second surface;

first extension measurement means for measuring distortions of said first inflection arm caused by said massive body during displacement of the tilt-sensor and for issuing a signal in dependence on the tilt angle; and second extension measurement means for measuring distortions of said second inflection arm caused by said massive body during displacement of the tilt-sensor and for issuing a signal in dependence on the tilt angle.

2. The tilt-sensor of claim 1, wherein said first leg is disposed at an angle of 90° with respect to said second leg.

3. The tilt-sensor of claim 2, wherein said massive body is cube-shaped.

4. The tilt-sensor of claim 1, wherein said massive body has a density greater than an average density of solids.

5. The tilt-sensor of claim 1, further comprising a base plate upon which said receptacle is movably disposed.

6. The tilt-sensor of claim 5, wherein said base plate has a first border at a first side thereof and a second border at a second side thereof.

7. The tilt-sensor of claim 6, further comprising damping means disposed between said receptacle and at least one of said first border and said second border.

8. The tilt-sensor of claim 1, wherein said receptacle consists essentially of silicon.

9. The tilt-sensor of claim 1, wherein said first and said second inflection arms are manufactured using micromechanical technology.

* * * * *